(12) United States Patent
Lee

(10) Patent No.: US 7,451,080 B2
(45) Date of Patent: Nov. 11, 2008

(54) CONTROLLING APPARATUS AND METHOD FOR BIT RATE

(75) Inventor: Sang-Youp Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 491 days.

(21) Appl. No.: 11/135,474

(22) Filed: May 24, 2005

(65) Prior Publication Data
US 2006/0018553 A1    Jan. 26, 2006

(30) Foreign Application Priority Data
Jul. 22, 2004    (KR) .................. 10-2004-0057240

(51) Int. Cl.
*G10L 19/02* (2006.01)
(52) U.S. Cl. .................. 704/229; 704/230; 704/500
(58) Field of Classification Search ......... 704/500–505, 704/229, 230
See application file for complete search history.

(56) References Cited

FOREIGN PATENT DOCUMENTS

| KR | 1995-0028521 | 5/1999 |
|---|---|---|
| KR | 2001-0064266 | 7/2000 |
| KR | 1999-0009352 | 7/2001 |
| WO | WO 00/18137 | 3/2000 |
| WO | WO 02/089486 | 11/2002 |
| WO | WO02089486 A2 * | 11/2002 |
| WO | WO 03/028237 | 3/2003 |

* cited by examiner

*Primary Examiner*—Huyen X. Vo
(74) *Attorney, Agent, or Firm*—Roylance, Abrams, Berdo & Goodman, LLP

(57) ABSTRACT

An apparatus and a method for controlling a bit rate are provided. The apparatus and method includes a buffer for storing information as to a bit rate of a frame immediately preceding a frame to be compressed, a bit rate controller for generating a target bit rate and an expected bit rate of the frame to be compressed based on the bit rate of the immediately-preceding frame and calculating a target quantization level to be applied to the frame to be compressed based on the target bit rate, with the expected bit rate and a quantization level applied to the immediately-preceding frame. The apparatus and method also includes a quantizer for performing a quantization process based on the target quantization level.

10 Claims, 3 Drawing Sheets

CONTROLLING APPARATUS AND METHOD FOR BIT RATE

CROSS-REFERENCE TO RELATED APPLICATION

This application claims the benefit under 35 U.S.C. §119(a) of Korean Patent Application No. 2004-57240, filed on Jul. 22, 2004, in the Korean Intellectual Property Office, the entire disclosure of which is hereby incorporated by reference.

BACKGROUND OF THE INVENTION

1. Field of the Invention

The present invention relates to an apparatus and a method for controlling a bit rate. More particularly, the present invention relates to an apparatus and a method for controlling a bit rate by adopting factors of coding complexity.

2. Description of the Related Art

With the development of microprocessors, semiconductors and digital signal processors, the technology for digitizing, storing, and transmitting an image signal has rapidly developed. However, when an image signal is stored and transmitted digitally, a bandwidth of the uncompressed image signal is very large compared to an analog transmission. Thus, the digital image signal needs to be compressed to remove surplus information to economically and efficiently utilize a transmission channel and a storage medium.

To meet this requirement, a Discrete Cosine Transform (DCT)-based compression method is widely used to compress image signals. In the DCT-based compression method, the spectrum of the image signal on which DCT is performed is concentrated in the low frequency portion. Thus, image information of a raw image signal can be fully represented by using a small number of bits by fully coding the low frequency portion.

Also, variable length coding (VLC) is performed on the image signal in which the DCT has been performed so as to compress the image signal. The VLC variably allocates and transmits predetermined code words with reference to the probability density of image information. Thus, the VLC is suitable for non-uniformly distributed image information to be processed. Therefore, DCT-based VLC is very appropriate as a compression method for fully representing the image signal comprising the non-uniformly distributed image information.

However, a controlled bit rate is required to transmit bits of the non-uniformly generated image signal when the non-uniformly distributed image information is compressed, at a constant transmission rate in order to maintain a stable system. In other words, when compressed image signals using VLC are stored or transmitted, a bit rate per unit time must be constant. Thus, a buffer should be installed to control the bit rate. Here, the quantization level of a quantizer should be adjusted to control the bit rate.

FIG. 1 is a block diagram of a conventional DCT-based compressor. Referring to FIG. 1, a conventional DCT-based compressor 100 comprises a discrete cosine transformer 101, a quantizer 103, a variable length coder 105, a buffer 107, an inverse quantizer 109, an inverse discrete cosine transformer 111, a motion estimator 113, a motion compensator 115, and a frame memory 117. The conventional DCT-based compressor 100 further comprises a complexity operator 119 and a bit rate controller 120.

The discrete cosine transformer 101 performs DCT on a frame of an input image signal to be compressed to transform the image signal over a space into energy distribution over a frequency. The quantizer 103 approximates coefficient data output from the discrete cosine transformer 101 to a finite number of values and scans the values in a zigzag manner to one-dimensionally rearrange the values. Here, the quantizer 103 performs a quantization process based on a quantization level Q output from the bit rate controller 120. Here, the quantization level Q is also called a quantization parameter in the Motion Picture Experts Group (MPEG)-4 specifications.

The variable length coder 105 performs VLC on data output from the quantizer 103 to compress the data. The buffer 107 sequentially stores data output from the variable length coder 105 and sequentially outputs the data. Thus, the buffer 107 can recognize bit rate information R of the frame to be compressed. The buffer 107 also provides bit rate information R of a frame (hereinafter referred to as an 'immediately-preceding frame') immediately preceding the frame to be compressed to the bit rate controller 120.

The inverse quantizer 109 receives the data from the quantizer 103 and inverse-quantizes the data. The inverse discrete cosine transformer 111 performs inverse DCT on data output from the inverse quantizer 109 to decode the data into a raw image signal. The motion estimator 113 generates a motion vector M.V. according to data and the raw image signal output from the inverse discrete cosine transformer 111. The motion compensator 115 estimates motion compensation from the immediately-preceding frame or a plurality of previous frames in the order of coding according to the motion vector M.V. output from the motion estimator 113 and outputs the estimation result. Reference numeral 117 denotes the frame memory for storing image information transmitted via the inverse discrete cosine transformer 111 or the like.

The bit rate controller 120 comprises a target bit rate operator 121 and a quantization level operator 125. The complexity operator 119 determines coding complexity of the frame to be compressed to generate a complexity coefficient S. The bit rate controller 120 receives the complexity coefficient S from the complexity operator 119 and the bit rate information R of the immediately-preceding frame from the buffer 107. The target bit rate operator 121 generate a target bit rate $R_T$ of the frame to be compressed based on bit rate information R of the previous frames comprising the immediately-preceding frame and bit rates of uncompressed frames of the image signal and outputs the target bit rate $R_T$ to the quantizer level operator 125. The quantization level operator 125 calculates the quantization level Q based on the target bit rate $R_T$ and the complexity coefficient S output from the complexity operator 119 for using Equation 1:

$$R_T = X_1 \times S \times Q^{-1} + X_2 \times S \times Q^{-2} \qquad (1)$$

wherein $R_T$ denotes the target bit rate of the frame to be compressed, S denotes the complexity coefficient, Q denotes the quantization level, and $X_1$ and $X_2$ denote modeling parameters that can vary to provide optimal compression for any compressor. Equation 1 is described based on the MPEG-4 specifications, which is hereby incorporated by reference.

The quantization level Q generated by the quantization level operator 125 is output to the quantizer 103. Accordingly, the frame to be compressed is compressed in control of the bit rate based on the complexity coefficient S of the immediately-preceding frame.

As described above, the conventional DCT-based compressor 100 additionally comprises the complexity operator 119. However, the complexity operator 119 determines the complexity coefficient S using the raw image signal, which causes a compression velocity to become slower. Also, since the complexity operator 119 determines the complexity coefficient S in the unit of pixel, a high capacity memory is required. Thus, per unit manufacturing cost of the conventional DCT-based compressor 100 may increase. In addition, in a case where the complexity operator 119 is not reflected on already-designed hardware, the complexity operator 119 may not be applied.

SUMMARY OF THE INVENTION

Accordingly, the present general inventive concept made to solve the above-mentioned problems and to provide other advantages, and an aspect of the present general inventive concept is to provide an apparatus and a method for controlling a bit rate to reflect factors of coding complexity without directly determining the coding complexity.

According to an aspect of the present invention, provided is an apparatus for controlling a bit rate of each frame when each frame of an image signal is compressed. The apparatus comprises a buffer for storing information as to a bit rate of a frame immediately preceding a frame to be compressed; a bit rate controller for generating a target bit rate and an expected bit rate of the frame to be compressed based on the bit rate of the immediately-preceding frame and calculating a target quantization level to be applied to the frame to be compressed based on the target bit rate, the expected bit rate, and a quantization level applied to the immediately-preceding frame; and a quantizer for performing a quantization process based on the target quantization level.

The bit rate controller may determine the target quantization level $Q_T$ by using Equation $Q_T=(Q_n/R_T) \times R_{n+1}$, wherein $Q_n$, $R_T$, and $R_{n+1}$ denote the quantization level applied to the immediately-preceding frame, the target bit rate, and the expected bit rate, respectively.

The bit rate controller may comprise a target bit rate operator for generating the target bit rate of the frame to be compressed based on the bit rate of the immediately-preceding frame and bit rates of uncompressed frames of the image signal; an expected bit rate estimator for estimating the expected bit rate by using a predetermined estimation filter to which bit rates of a plurality of frames previous to the frame to be compressed are applied; and a quantization level operator for determining the target quantization level based on the target bit rate, the expected bit rate, and the quantization level applied to the immediately-preceding frame.

The predetermined estimation filter may be one of an average filter and a Kalman filter capable of estimating data.

The target bit rate operator may generate the target bit rate according to a ratio of the bit rates of the previous frames comprising the immediately-preceding frame to the bit rates of the uncompressed frames of the image signal.

According to another aspect of the present invention, provided is a method of controlling a bit rate of each frame when each frame of an image signal is compressed. The method comprises steps of generating a target bit rate and an expected bit rate of a stored frame to be compressed based on a bit rate of a frame immediately preceding the frame to be compressed; calculating a target quantization level to be applied to the frame to be compressed based on the target bit rate, the expected bit rate, and a quantization level applied to the immediately-preceding frame; and performing a quantization process based on the target quantization level.

BRIEF DESCRIPTION OF THE DRAWINGS

The above aspects and features of the present invention will be more apparent by describing certain embodiments of the present invention with reference to the accompanying drawings, in which.

Throughout the drawings, it should be noted that like reference numbers are used to depict the same or similar elements, features and structures.

DETAILED DESCRIPTION OF EXEMPLARY EMBODIMENTS

Exemplary embodiments of the present invention will be described in greater detail with reference to the accompanying drawings.

The matters defined in the description such as a detailed construction and elements are exemplary. Thus, it is apparent that various changes and modifications can be made to the examples provided herein without departing from the scope and sprit of the present invention. Also, well-known functions or constructions are not described in detail in order to provide a clear and concise description of the exemplary embodiment of the present invention.

Figure 2:
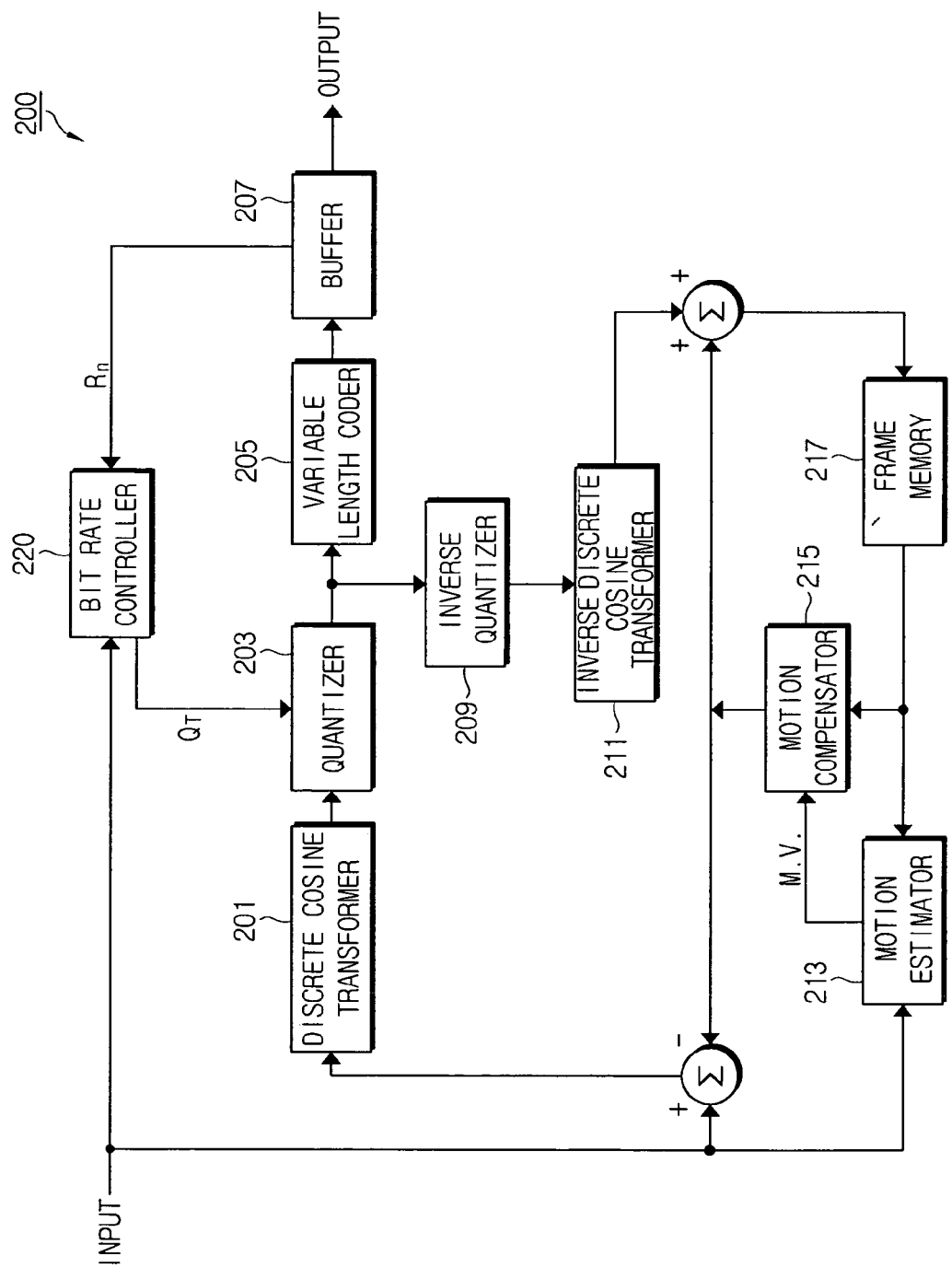
FIG. 2 is a block diagram of a DCT-based compressor, according to an embodiment of the present invention.
Figure 3:
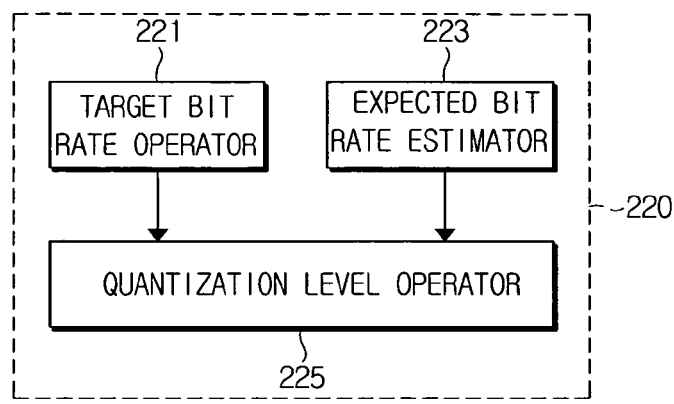
FIG. 3 is a block diagram of a bit rate controller shown in FIG. 2 according to an embodiment of the present invention.

FIG. 2 is a block diagram of a DCT-based compressor, according to an embodiment of the present invention, and FIG. 3 is a block diagram of the bit rate controller shown in FIG. 2.

Referring to FIG. 2, a DCT-based compressor 200 comprises a discrete cosine transformer 201, a quantizer 203, a variable length coder 205, a buffer 207, an inverse quantizer 209, an inverse discrete cosine transformer 211, a motion estimator 213, a motion compensator 215, and a frame memory 217. The DCT-based compressor 200 further comprises a bit rate controller 220.

Figure 1:
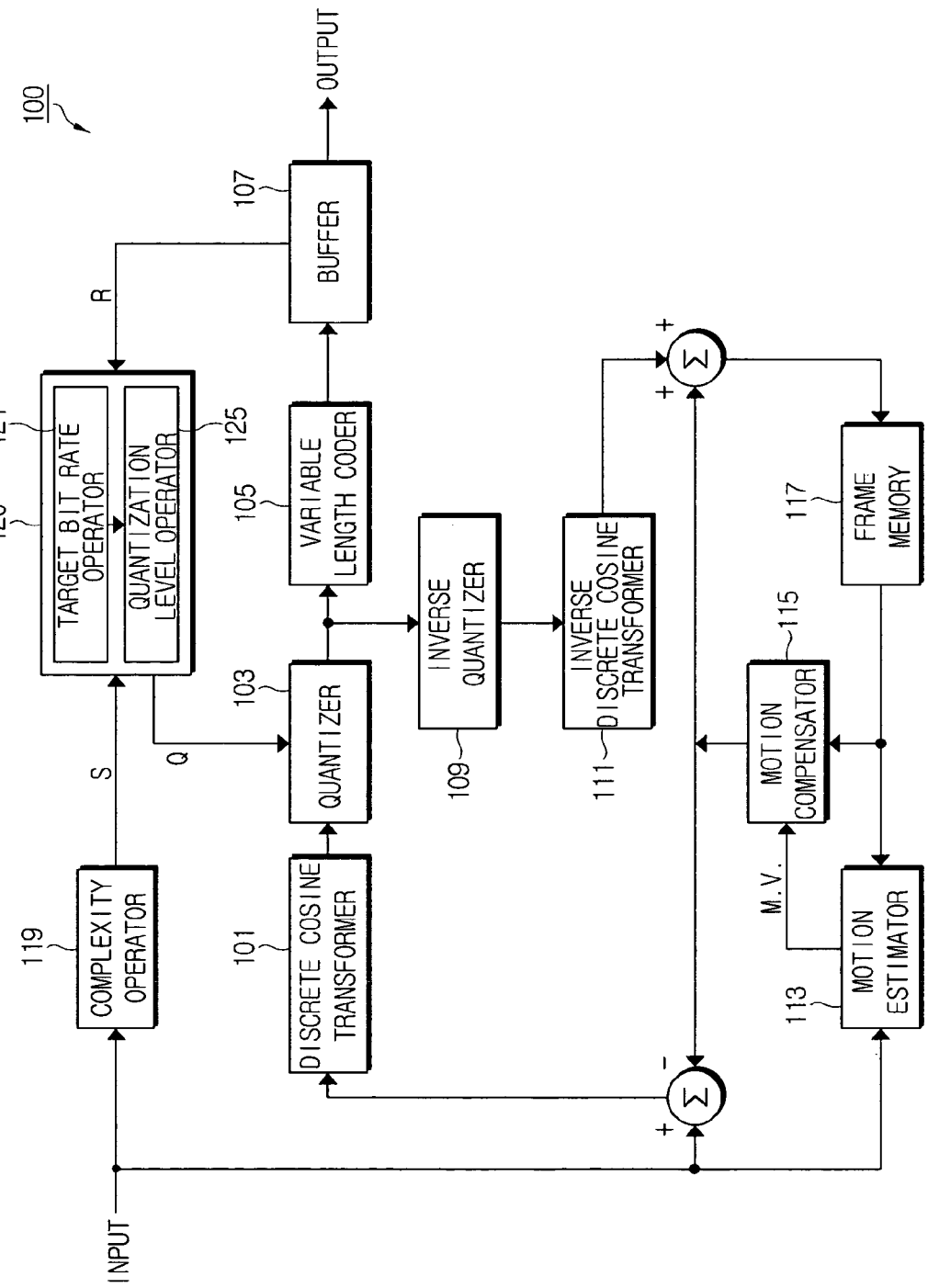
FIG. 1 is a block diagram of a conventional DCT-based compressor.

The bit rate controller 220 receives bit rate information $R_n$ of an immediately-preceding frame from the buffer 207. The bit rate controller 220 generates a target quantization level $Q_T$ based on the bit rate information $R_n$ of the immediately-preceding frame and outputs the target quantization level $Q_T$ to the quantizer 203. The quantizer 203 performs a quantization process based on the target quantization level $Q_T$. According to an exemplary embodiment of the present invention, although the complexity operator 119 shown in FIG. 1 is not described in detail herein, factors of coding complexity are reflected in the target quantization level $Q_T$.

Referring to FIG. 3, the bit rate controller 220 comprises a target bit rate operator 221, an expected bit rate estimator 223, and a quantization level operator 225.

The target bit rate operator 221 generates a target bit rate $R_T$ of a frame to be compressed based on the bit rate information $R_n$ of the immediately-preceding frame and bit rates of uncompressed frames of an image signal and outputs the target bit rate $R_T$ to the quantization level operator 225. Here, the target bit rate $R_T$ is preferably determined depending on a ratio of the bit rate information $R_n$ of the immediately-preceding frame, bit rates of previous frames, and the bit rates of the uncompressed frames of the image signal.

The expected bit rate estimator 223 estimates an expected bit rate $R_{n+1}$ of the frame to be compressed by using bit rate information $R_{n-a}, R_{n-a+1}, \ldots, R_{n-1}$, and $R_n$ of a plurality of frames previous to the frame to be compressed and outputs the expected bit rate $R_{n+1}$ to the quantization level operator 225. Here, the number of the plurality of previous frames can be changed according to a manufacturer or a user.

The expected bit rate estimator 223 may adopt various estimation filters capable of estimating data in an expected bit rate estimation method. For example, the expected bit rate estimator 223 may adopt an average filter, a Kalman filter, or any other suitable filter. However, the exemplary embodiment of present invention described herein adopts any expected bit rate estimation method by which a bit rate of a frame to be compressed can be estimated from bit rate information of previous frames.

The quantization level operator 225 stores quantization level information $Q_n$ applied to the immediately-preceding frame.

The quantization level operator 225 determines a target quantization level $Q_T$ to be applied to the frame to be compressed based on the target bit rate $R_T$ output from the target bit rate operator 221, the expected bit rate $R_{n+1}$ output from the expected bit rate estimator 223, and the stored quantization level $Q_n$ applied to the immediately-preceding frame. Here, the target quantization level $Q_T$ can be calculated by using Equation 2:

$$Q_T = (Q_n/R_T) \times R_{n+1}. \tag{2}$$

Therefore, according to an exemplary embodiment of the present invention, factors of coding complexity are considered without a complexity operator to determine a quantization level. The basis of this will now be described in further detail.

Hereinafter, $Q_n$ denotes the quantization level applied to the immediately-preceding frame, and $Q_{n+1}$ denotes a virtual quantization level to be applied to the frame to be compressed. Also, $A_n$ denotes a complexity reflection parameter of the immediately-preceding frame, and $A_{n+1}$ denotes a complexity reflection parameter of the frame to be compressed. In addition, $R_n$ denotes the bit rate information of the immediately-preceding frame, and $R_{n+1}$ denotes the expected bit rate of the frame to be compressed that is generated by using the above-presented estimation method. $R_T$ denotes the target bit rate of the frame to be compressed, and $Q_T$ denotes the target quantization level to be applied to the frame to be compressed. As described above, the target bit rate $R_T$ of the frame to be compressed is calculated based on the bit rate information $R_n$ of the immediately-preceding frame and the bit rates of the uncompressed frames of the image signal.

i) It assumes that $Q_n$ is equal to $Q_{n+1}$. This supposition is made to estimate the bit rate $R_{n+1}$ to be expected when the quantizaiton level $Q_n$ applied to the immediately-preceding frame is applied to the frame to be compressed.

ii) $A_n$ is defined as in Equation 3 below. Here, considering Equation 1, $A_n$ is a parameter on which factors of coding complexity is reflected. This definition is attributed to an inversely proportional relationship between the quantization level and the bit rate.

$$A_n = R_n \times Q_n. \tag{3}$$

iii) Then, since $R_n = A_n/Q_n$ is brought into existence through Equation 3, Equation 4 can be brought into existence:

$$A_{n+1} = R_{n+1} \times Q_{n+1}. \tag{4}$$

iv) The result shown in Equation 5 can be derived from the assumption that $Q_n$ is equal to $Q_{n+1}$:

$$A_{n+1} = R_{n+1} \times Q_n. \tag{5}$$

v) When the target bit rate and the target quantization level of the frame to be compressed are assumed as $R_T$ and $Q_T$, respectively, $R_{n+1}$ may correspond to $R_T$ and $Q_{n+1}$ may correspond to $Q_T$. Thus, Equations 6 and 7 can be brought into existence through Equation 4:

$$A_{n+1} = R_T \times Q_T \tag{6}$$

$$R_T = A_{n+1}/Q_T. \tag{7}$$

vi) Equations 8 and 9 are derived from the substitution of $A_{n+1}$ of Equation 5 for Equation 7:

$$R_T = (R_{n+1} \times Q_n)/Q_T \tag{8}$$

$$Q_T = (R_{n+1} \times Q_n)/R_T \tag{9}$$

vii) Accordingly, the same result as that of Equation 2 can be deduced. Here, an attention should be played to the fact that the parameter $A_n$ on which the coding complexity is reflected is considered and offset to reflect the factors of the coding complexity, but the coding complexity is substantially not calculated.

Figure 4:
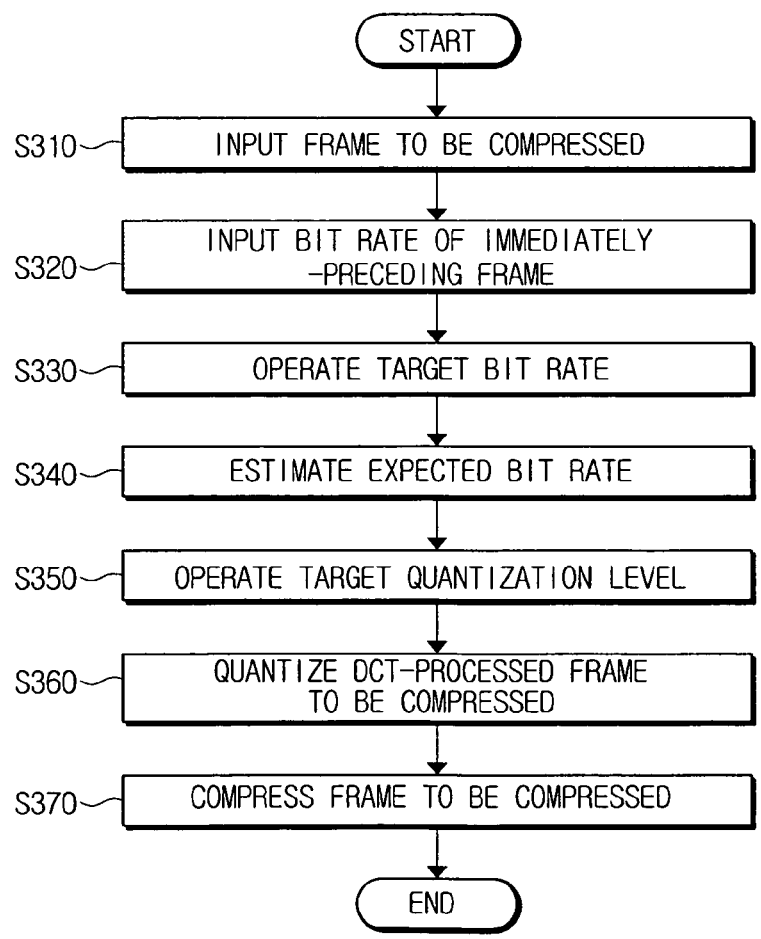
FIG. 4 is a flowchart illustrating a method of controlling a bit rate, according to an embodiment of the present invention.

FIG. 4 is a flowchart for illustrating a method of controlling a bit rate, according to an embodiment of the present invention.

Referring to FIGS. 2 through 4, at step S310, the frame to be compressed is input to the DCT-based compressor 200.

At step S320, the bit rate information $R_n$ of the immediately-preceding frame is input from the buffer 207 to the bit rate controller 220. At step S330, the target bit rate operator 221 of the bit rate controller 220 determines the target bit rate $R_T$ of the frame to be compressed based on the bit rate information $R_n$ of the immediately-preceding frame and the bit rates of the uncompressed frames of the image signal. At step S340, the expected bit rate estimator 223 estimates the expected bit rate $R_{n+1}$ of the frame to be compressed based on the bit rate information $R_{n-a}, R_{n-a+1}, \ldots, R_{n-1}$, and $R_n$ of the plurality of frames previous to the frame to be compressed. At step S350, the quantization level operator 225 determines the target quantization level $Q_T$ to be applied to the frame to be compressed based on the target bit rate $R_T$, the expected bit rate $R_{n+1}$, and the quantization level $Q_n$ applied to the immediately-preceding frame. Here, the target quantizaiton level $Q_T$ is preferably determined by using Equation 2 above.

At step S360, the target quantizaiton level $Q_T$ is output to the quantizer 203, and the DCT-processed frame to be compressed is quantized based on the target quantizaiton level $Q_T$. At step S370, the quantized frame to be compressed is compressed and output through the variable length coder 205 and the buffer 207.

As described above, in an apparatus and a method for controlling a bit rate according to exemplary embodiments of the present invention, an additional block is not required to determine a complexity coefficient, and the complexity coefficient is not required to be additionally determined. Thus, a compression velocity can be increased by the time required for determining the complexity coefficient. Also, since a memory is not required to determine the complexity coefficient, per unit manufacturing cost can decrease. A product for adopting exemplary embodiments of the present invention can thus advantageously be made less expensive. Moreover, exemplary embodiments of the present invention can be implemented as a software program and thus can be applied to already-designed hardware.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An apparatus for controlling a bit rate of each frame when each frame of an image signal is compressed, the apparatus comprising:
    a buffer for storing information as to a bit rate of a frame immediately-preceding a frame to be compressed;
    a bit rate controller for generating target and expected bit rates of the frame to be compressed based on the bit rate of the immediately-preceding frame and calculating a target quantization level to be applied to the frame to be compressed based on the target bit rate, the expected bit rate, and a quantization level applied to the immediately-preceding frame; and
    a quantizer for performing a quantization process based on the target quantization level;
    whereby the bit rate is controlled.

2. An apparatus for controlling a bit rate of each frame when each frame of an image signal is compressed, the apparatus comprising:
    a buffer for storing information as to a bit rate of a frame immediately-preceding a frame to be compressed;
    a bit rate controller for generating target and expected bit rates of the frame to be compressed based on the bit rate of the immediately-preceding frame and calculating a target quantization level to be applied to the frame to be compressed based on the target bit rate, the expected bit rate, and a quantization level applied to the immediately-preceding frame; and
    a quantizer for performing a quantization process based on the target quantization level;
    wherein the bit rate controller determines the target quantization level $Q_T$ by using Equation below:

$$Q_T = (Q_n/R_T) \times R_{n+1}$$

wherein $Q_n$, $R_T$, and $R_{n+1}$ denote the quantization level applied to the immediately-preceding frame, the target bit rate, and the expected bit rate, respectively;
    whereby the bit rate is controlled.

3. An apparatus for controlling a bit rate of each frame when each frame of an image signal is compressed, the apparatus comprising:
    a buffer for storing information as to a bit rate of a frame immediately-preceding a frame to be compressed;
    a bit rate controller for generating target and expected bit rates of the frame to be compressed based on the bit rate of the immediately-preceding frame and calculating a target quantization level to be applied to the frame to be compressed based on the target bit rate, the expected bit rate, and a quantization level applied to the immediately-preceding frame; and
    a quantizer for performing a quantization process based on the target quantization level;
    wherein the bit rate controller comprises:
        a target bit rate operator for generating the target bit rate of the frame to be compressed based on the bit rate of the immediately-preceding frame and bit rates of uncompressed frames of the image signal;
        an expected bit rate estimator for estimating the expected bit rate by using a predetermined estimation filter to which bit rates of a plurality of frames previous to the frame to be compressed are applied; and
        a quantization level operator for determining the target quantization level based on the target bit rate, the expected bit rate, and the quantization level applied to the immediately-preceding frame;
    whereby the bit rate is controlled.

4. The apparatus of claim 3, wherein the predetermined estimation filter is one of an average filter and a Kalman filter capable of estimating data.

5. The apparatus of claim 3, wherein the target bit rate operator generates the target bit rate according to a ratio of the bit rates of the previous frames comprising the immediately-preceding frame to the bit rates of the uncompressed frames of the image signal.

6. A method of controlling a bit rate of each frame when each frame of an image signal is compressed, the method comprising the steps of:
    generating target and expected bit rates of a frame to be compressed based on a bit rate of a frame immediately preceding the frame to be compressed;
    calculating a target quantization level to be applied to the frame to be compressed based on the target bit rate, the expected bit rate, and a quantization level applied to the immediately-preceding frame; and
    performing a quantization process based on the target quantization level;
    whereby the bit rate is controlled.

7. A method of controlling a bit rate of each frame when each frame of an image signal is compressed, the method comprising the steps of:
    generating target and expected bit rates of a frame to be compressed based on a bit rate of a frame immediately preceding the frame to be compressed;
    calculating a target quantization level to be applied to the frame to be compressed based on the target bit rate, the expected bit rate, and a quantization level applied to the immediately-preceding frame; and
    performing a quantization process based on the target quantization level;
    wherein the target quantization level $Q_T$ is determined by using Equation below:

$$Q_T = (Q_n/R_T) \times R_{n+1}$$

wherein $Q_n$, $R_T$, and $R_{n+1}$ denote the quantization level applied to the immediately-preceding frame, the target bit rate, and the expected bit rate, respectively;
    whereby the bit rate is controlled.

8. A method of controlling a bit rate of each frame when each frame of an image signal is compressed, the method comprising the steps of:
    generating target and expected bit rates of a frame to be compressed based on a bit rate of a frame immediately preceding the frame to be compressed;
    calculating a target quantization level to be applied to the frame to be compressed based on the target bit rate, the expected bit rate, and a quantization level applied to the immediately-preceding frame; and
    performing a quantization process based on the target quantization level;
    wherein the calculation of the target quantization level comprises the steps of:
        determining the target bit rate of the frame to be compressed based on the bit rate of the immediately-preceding frame and bit rates of uncompressed frames of the image signal;

estimating the expected bit rate of the frame to be compressed by using a predetermined filter to which bit rates of a plurality of frames previous to the frame to be compressed are applied; and determining the target quantization level based on the target bit rate, the expected bit rate, and the quantization level applied to the immediately-preceding frame;

whereby the bit rate is controlled.

9. The method of claim 8, wherein the predetermined estimation filter is one of an average filter and a Kalman filter capable of estimating data.

10. The method of claim 8, wherein the target bit rate is determined according to a ratio of the bit rates of the previous frames comprising the immediately-preceding frame to the bit rates of the uncompressed frames of the image signal.

* * * * *